(12) United States Patent
Yamane (10) Patent No.: US 12,420,562 B2
(45) Date of Patent: Sep. 23, 2025

(54) HEATER, HEAT SEALING DEVICE, THERMAL TRANSFER PRINTER, AND CONTAINER PROCESSING APPARATUS

(71) Applicant: PACRAFT Co., Ltd., Tokyo (JP)

(72) Inventor: Noriyuki Yamane, Yamaguchi-ken (JP)

(73) Assignee: PACRAFT CO., LTD., Tokyo (JP)

( * ) Notice: Subject to any disclaimer, the term of this patent is extended or adjusted under 35 U.S.C. 154(b) by 246 days.

(21) Appl. No.: 18/323,088

(22) Filed: May 24, 2023

(65) Prior Publication Data
US 2023/0382130 A1    Nov. 30, 2023

(30) Foreign Application Priority Data
May 30, 2022    (JP) .................. 2022-087934

(51) Int. Cl.
| | | |
|---|---|---|
| B41J 2/33 | (2006.01) | |
| B41J 2/335 | (2006.01) | |
| B65B 43/22 | (2006.01) | |
| B65B 43/50 | (2006.01) | |
| B65B 51/14 | (2006.01) | |
| H05B 3/56 | (2006.01) | |

(52) U.S. Cl.
CPC ............ *B41J 2/3353* (2013.01); *B65B 43/22* (2013.01); *B65B 43/50* (2013.01); *B65B 51/146* (2013.01); *H05B 3/56* (2013.01)

(58) Field of Classification Search
CPC .... B41J 2/315; B41J 2/325; B41J 2/32; B41F 16/00; B41F 16/0006; B29C 66/81465; B29C 66/81871; B29C 66/83221; B29C 66/73921; B29C 66/8122; B29C 65/7841; B29C 65/223; B29C 65/7882; B29C 66/1122; B29C 66/43121
See application file for complete search history.

(56) References Cited

U.S. PATENT DOCUMENTS 6,288,372 B1    9/2001    Sandberg et al.

FOREIGN PATENT DOCUMENTS

| CN | 211350135 U | 8/2020 |
|---|---|---|
| JP | H02-41392 U | 3/1990 |
| JP | 11-26141 A | 1/1999 |
| JP | 2010-027315 A | 4/2010 |
| JP | 2012-236615 A | 12/2012 |
| KR | 10-0709095 B1 | 4/2007 |
| KR | 10-1175778 B1 | 8/2012 |
| WO | 2007/081090 A1 | 7/2007 |

OTHER PUBLICATIONS

Extended European Search Report dated Oct. 26, 2023, issued in corresponding European Patent Application No. 23174783.3 (8 pgs.).
Notice of Reasons for Refusal dated Aug. 4, 2023, issued in corresponding Japanese Patent Application No. 2022-087934 with English translation (11, pgs.).

*Primary Examiner* — Kristal Feggins
(74) *Attorney, Agent, or Firm* — Pillsbury Winthrop Shaw Pittman, LLP (57) ABSTRACT

A heater includes: a heat generation unit that generates heat when energized; an electric wire that is attached to the heat generation unit and supplies electric current to the heat generation unit; a ground wire that is attached to the heat generation unit and is grounded; a conductive cover that includes an electrical conductor, is attached to the heat generation unit, and is grounded; and an insulating cover that has an electrical insulating property and at least partially covers the conductive cover.

9 Claims, 7 Drawing Sheets

HEATER, HEAT SEALING DEVICE, THERMAL TRANSFER PRINTER, AND CONTAINER PROCESSING APPARATUS

CROSS-REFERENCE TO RELATED APPLICATIONS

This application is based upon and claims the benefit of priority from Japanese Patent Application No. 2022-87934, filed on May 30, 2022; the entire contents of which are incorporated herein by reference.

TECHNICAL FIELD

The present disclosure relates to a heater, a heat sealing device, a thermal transfer printer, and a container processing apparatus.

BACKGROUND ART

Heaters equipped with heat generation units that generate heat when energized, such as the sheath heater unit disclosed in Japanese patent application publication No. 2010-027315 and the cartridge heater disclosed in Japanese utility-model application publication No. 2-41392, are used in various applications.

SUMMARY OF THE INVENTION

In some heaters equipped with heat generation units as described above, electrical leakage detection breakers that interrupt a circuit when an electrical leakage is detected are installed in order to deal with the leakage (i.e., electrical leakage) of the current supplied to the heat generation units.

An electrical leakage detection breaker may, for instance, detect an electrical leakage when a person contacts a heater portion (i.e., a charging portion) that is electrically connected to an electrical leakage section, and interrupt a circuit in response to said detection.

Further, if an electrical leakage breaker fails to operate properly due to malfunction or other reasons, people may receive electrical shock.

Furthermore, if a heater is flooded under unexpected circumstances, an electrical leakage may occur at an unexpected heater portion, and thus the electrical leakage portion may be electronically connected to an exposed heater portion via an unexpected route. In this case, if a person comes into contact with such an exposed heater portion, he or she will receive an electric shock.

The present disclosure has been made in view of the above-mentioned circumstances and has an object of providing a technique advantageous to curbing the influence of electrical leakage that may occur due to energization to a heater.

An aspect of the present disclosure is directed to a heater comprising: a heat generation unit that generates heat when energized; an electric wire that is attached to the heat generation unit and supplies electric current to the heat generation unit; a ground wire that is attached to the heat generation unit and is grounded; a conductive cover that includes an electrical conductor, is attached to the heat generation unit, and is grounded; and an insulating cover that has an electrical insulating property and at least partially covers the conductive cover.

The conductive cover may include a part extending along an outer circumference surface of the heat generation unit, and the insulating cover may include a part extending along the outer circumference surface of the heat generation unit.

The conductive cover may contain a metal and be flexible, and the insulating cover may contain at least one of a resin and an elastomer.

The conductive cover may have at least partially a mesh shape.

The heater may comprise an electrical leakage detection unit that detects an electrical leakage.

Another aspect of the present disclosure is directed to a heat sealing device comprising any one of the above-described heaters, wherein the heat generation unit includes: a heat generating body that generates heat when energized; and a sheath that covers the heat generating body, and wherein the insulating cover includes: a first insulating covering member that at least partially covers the conductive cover; and a second insulating covering member that at least partially covers the first insulating covering member and has a smaller stiffness than the first insulating covering member.

Another aspect of the present disclosure is directed to a thermal transfer printer that heats an ink ribbon to which an ink is applied and thermally transfers the ink to an object, the thermal transfer printer comprising any one of the above-described heaters, wherein the heat generation unit includes: a heat generating body that generates heat when energized; and a sheath that covers the heat generating body, wherein the insulating cover includes: a first insulating covering member that at least partially covers the conductive cover; and a second insulating covering member that at least partially covers the first insulating covering member and has a smaller stiffness than the first insulating covering member, and wherein the ink ribbon is heated by the heat emitted from the heat generating body.

Another aspect of the present disclosure is directed to a container processing apparatus comprising the above-described heat sealing device that performs a heat sealing processing on a container.

Another aspect of the present disclosure is directed to a container processing apparatus comprising the above-described thermal transfer printer that performs a print processing on a container.

According to the present disclosure, it is advantageous to curbing the influence of electrical leakage that may occur due to energization to a heater.

DETAILED DESCRIPTION

[Heater]

Figure 1:
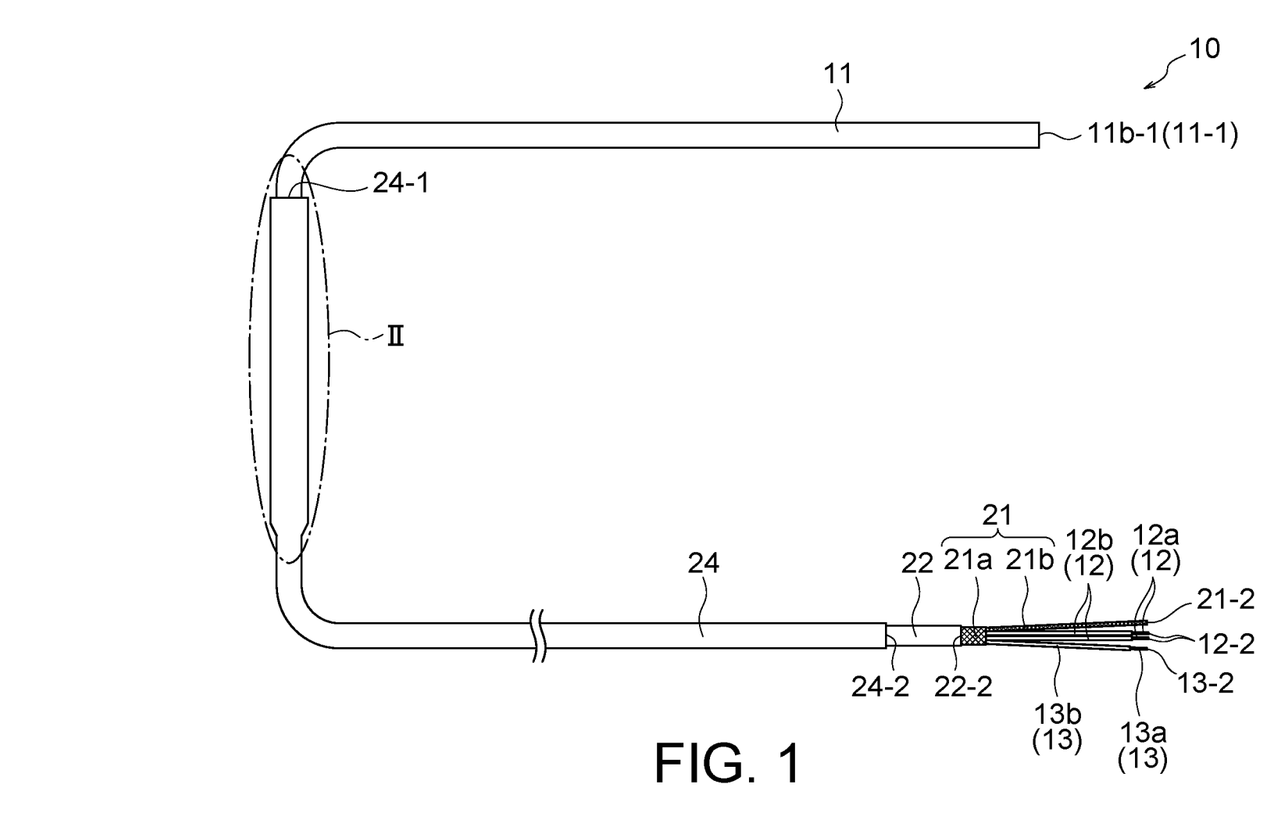
FIG. 1 is a diagram showing the outer appearance of one example of a heater.
Figure 2:
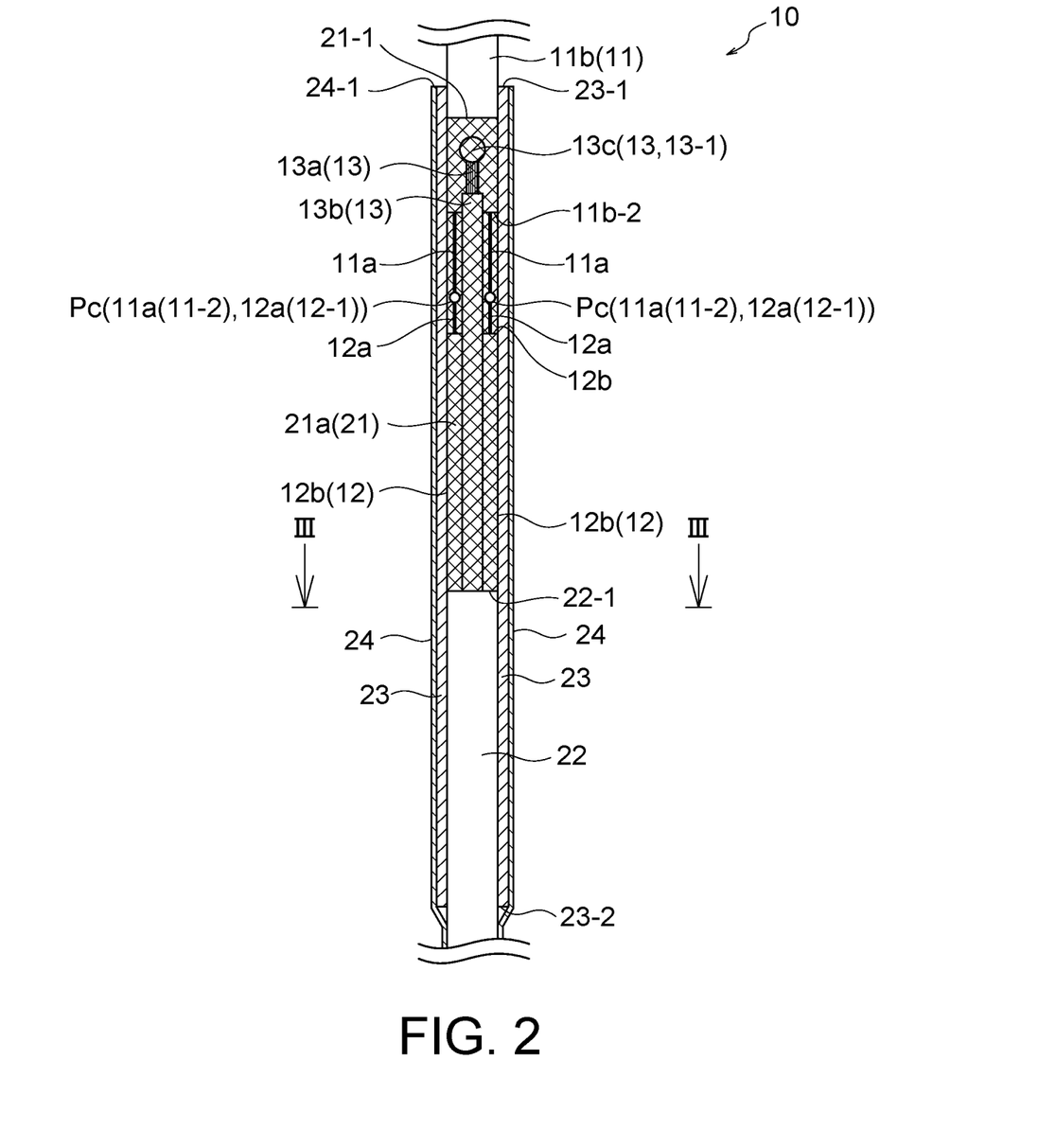
FIG. 2 is a diagram showing an example of the inner structure of the portion of the heater indicated by reference numeral "II" in FIG. 1.
Figure 3:
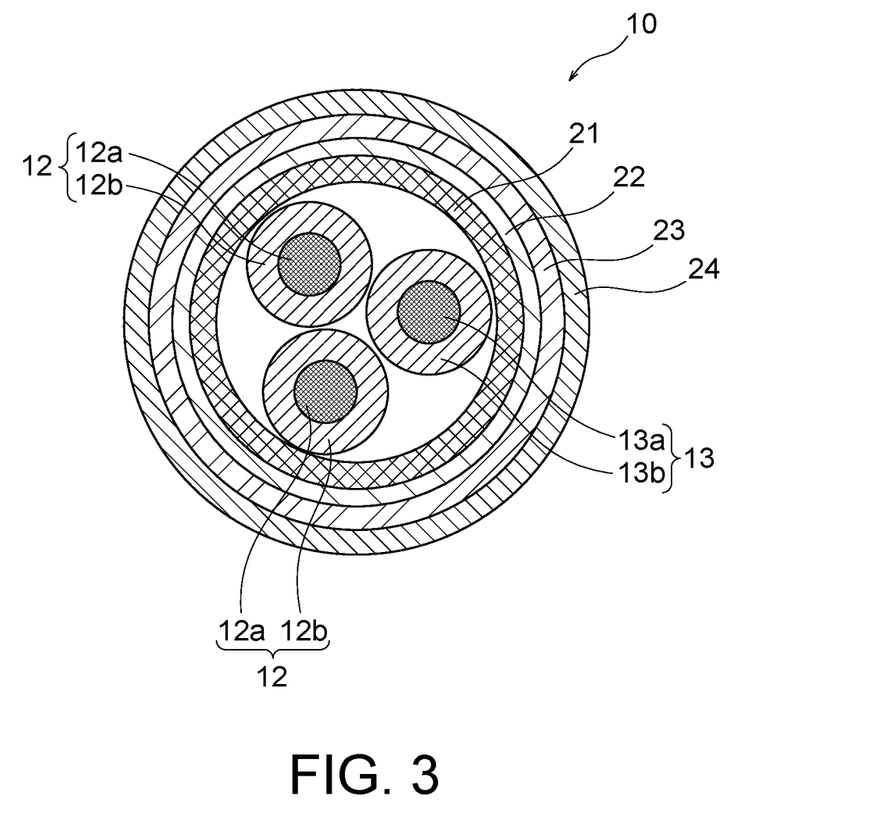
FIG. 3 is a diagram showing a cross-sectional example of the portion of the heater indicated by the cross-sectional line "III" in FIG. 2.

FIG. 1 is a diagram showing the outer appearance of one example of a heater 10. FIG. 2 is a diagram showing an example of the inner structure of the portion of the heater 10 indicated by reference numeral "II" in FIG. 1. In FIG. 2, a third covering member 23 and a fourth covering member 24 are shown in cross section while the other elements are shown in outer appearance. FIG. 3 is a diagram showing a cross-sectional example of the portion of the heater 10 indicated by the cross-sectional line "III" in FIG. 2.

The heater 10 comprises a heat generation unit 11, two electric wires 12, a ground wire 13, and a first covering member 21 to a fourth covering member 24.

The heat generation unit 11 generates heat by being energized, and at least part of the heat generating portion of the heat generation unit 11 is exposed to the outside without being covered by the first covering member 21 to the fourth covering member 24. The heat generation unit 11 in the present embodiment is a so-called sheath heater that includes: heat generating bodies 11a (see FIG. 2) having an elongated shape; and a sheath 11b covering the heat generating bodies 11a.

The heat generating bodies 11a are connected to the electric wires 12 and generate heat when an electric current supplied through the electric wires 12 is applied thereto. The heat generating bodies 11a may have any composition. For instance, in a case where the heat generating bodies 11a are formed by nichrome wires, vibration and collision of electrons/atoms inside the nichrome wires are induced by the application of voltage to the heat generating bodies 11a, resulting in heat generation in the heat generating bodies 11a.

The sheath 11b, which covers the heat generating bodies 11a so that the heat generating bodies 11a are not exposed to the outside, prevents physical contact with the heat generating bodies 11a from the outside while radiating the heat transferred from the heat generating bodies 11a toward the outside. The sheath 11b shown in FIG. 1 is bent to have an L-shape, and the heat generating bodies 11a are also bent, inside the sheath 11b, along the sheath 11b to have an L-shape.

The sheath 11b, which constitutes the externally exposed portion of the heat generation unit 11, is electrically insulated from the heat generating bodies 11a in this manner, and for instance, the inner cavity of the sheath 11b is filled with an insulating material (such as insulating powders) in such a manner that the insulating material surrounds the heat generating bodies 11a. With the insulating material between the heat generating bodies 11a and the sheath 11b in this fashion, the electric current is basically not transmitted from the heat generating bodies 11a to the sheath 11b. Thus, even if a user accidentally touches the sheath 11b, the user basically does not receive an electrical shock.

However, an electrical path may be established between the sheath 11b and the heat generating bodies 11a due to electric leakage. Even in such a case, the heater 10 of the present embodiment can prevent the user who touches the sheath 11b, from receiving an electric shock based on two-point ground formed by the ground wire 13 and the first covering member 21 as described below.

The electric wires 12 are attached to the heat generation unit 11 and are electrically connected to the heat generating bodies 11a as well as to the power supply (see FIG. 4), to supply current from the power supply to heat generating bodies 11a.

An electric wire 12 of the present example includes: a conductive electric wire body part 12a; and an electric wire insulating covering part 12b that has a cylindrical shape and covers the middle part of the electric wire body part 12a. While both ends of an electric wire body part 12a protrude from the electric wire insulating covering part 12b and are exposed, the middle part of the electric wire body part 12a is covered by the electric wire insulating covering part 12b to be electrically insulated from other members (the ground wire 13 and the first covering member 21 to the fourth covering member 24). One end of an electric wire body part 12a constitutes the leading tip side end 12-1 of an electric wire 12 (see FIG. 2) and is joined to a heat generating body 11a. Thus, an electrical connection is established between the electric wire body parts 12a (an electric wire 12) and the heat generating bodies 11a (the heat generation unit 11). The other end of an electric wire body part 12a constitutes the base side end 12-2 of an electric wire 12 (see FIG. 1) and is electrically connected to the power supply (see FIG. 4).

In the example shown in FIG. 2, at the junction points Pc, the heat generating bodies 11a protruding from the sheath 11b are connected to the electric wire body parts 12a protruding from the electric wire insulating covering part 12b. However, the connection manner between the heat generating bodies 11a and the electric wire body parts 12a is not limited. The heat generating bodies 11a and the electric wire body parts 12a may be connected to each other at points (dots) as shown in FIG. 2 or may be connected to each other over certain length ranges. The heat generating bodies 11a and the electric wire body parts 12a may be covered and protected by impact-resistant guard enclosure parts (not shown in the drawings) made of metal or another material in the range including their mutual connection parts (i.e., junction points Pc).

The electric wires 12 (in particular, the electric wire body parts 12a) shown in FIG. 2 are connected to the base side ends of the heat generating bodies 11a, but the connection positions of the heat generating bodies 11a with respect to the electric wire body parts 12a are not limited. Further, the connection manner between the heat generating bodies 11a and the electric wires 12 are also not limited. The heat generating bodies 11a and the electric wire body parts 12a may be connected directly to each other or may be connected indirectly to each other through other conductors (not shown in the drawings). Therefore, the heat generating bodies 11a and the electric wires 12 may be twisted together to be in direct contact with each other, or may be connected to each other via conductive joining members such as conductive adhesives. Further, the heat generating bodies 11a and the electric wire body parts 12a may be connected to each other via cylindrical connecting members (e.g., crimp sleeves) made of lead or another material for instance.

The ground wire 13 is attached to the heat generation unit 11, and is electrically connected to the sheath 11b in a state where being electrically insulated from the heat generating bodies 11a. The ground wire 13 is also electrically connected to a ground (see FIG. 4) and is grounded.

The ground wire 13 in the present example includes: a conductive ground wire body part 13a; and a ground wire insulation covering part 13b that has a cylindrical shape and covers the middle portion of the ground wire body part 13a. Both ends of the ground wire body part 13a protrude from the ground wire insulating covering part 13b to be exposed to the outside, while the middle part of the ground wire body part 13a is covered by the ground wire insulating covering part 13b to be electrically insulated from the other members (the electric wires 12 and the first covering member 21 through the fourth covering member 24). One end of the ground wire body part 13a constitutes the leading tip side end 13-1 of the ground wire 13 (see FIG. 2) and is fixedly joined to the sheath 11b. Thus, an electrical connection is established between the ground wire body part 13a (the ground wire 13) and the sheath 11b (the heat generation unit 11) (see the ground junction part 13c shown in FIG. 2). The other end of the ground wire body part 13a constitutes the base side end 13-2 of the ground wire 13 (see FIG. 1) and is electrically connected to the ground (see FIG. 4) and is grounded.

The ground wire 13 shown in FIG. 2 is connected to the end of the sheath 11b, but the connection position of the sheath 11b with respect to the ground wire 13 is not limited. The ground wire 13 may be connected directly to the sheath 11b as shown in FIG. 2, or may be electrically connected to the sheath 11b via a conductor (not shown in the drawings).

The first covering member 21 to the fourth covering member 24 have a cylindrical portion at least in part and cover the electric wires 12 and the ground wire 13 extending inside said cylindrical portion, from the outside. However, with respect to the extension direction of the heater 10, the extending range of the first covering member 21 to the fourth covering member 24 does not necessarily coincide with the extending ranges of the electric wires 12 and the ground wire 13.

Both ends of the first covering member 21 in the present example are indicated by reference numerals of "21-1 (see FIG. 2)" and "21-2 (see FIG. 1)". Both ends of the second covering member 22 are indicated by reference numerals of "22-1 (see FIG. 2)" and "22-2 (see FIG. 1)". Both ends of the third covering member 23 are indicated by reference numerals of "23-1 (see FIG. 2)" and "23-2 (see FIG. 2)". Both ends of the fourth covering member 24 are indicated by reference numerals of "24-1 (see FIG. 2)" and "24-2 (see FIG. 1)".

Further, both ends of the electric wires 12 are indicated by reference numerals of "12-1 (see FIG. 2)" and "12-2 (see FIG. 1)". Both ends of the ground wire 13 are indicated by reference numerals of "13-1 (see FIG. 2)" and "13-2 (see FIG. 1)".

Further, one end 11-1 of the heat generation unit 11 is formed by one end 11b-1 of the sheath 11b (see FIG. 1), and the other end 11-2 of the heat generation unit 11 is formed by one ends of the heat generating bodies 11a (see FIG. 2). The other end of the sheath 11b is indicated by reference numeral of "11b-2 (see FIG. 2)" and the other ends of the heat generating bodies 11a are not shown in the drawings. The location of the other ends (i.e., the leading tip side ends) of the heat generating bodies 11a, which are not shown in the drawings, is not limited, and the leading tip side ends of the heat generating bodies 11a may be located near the leading tip side end 11b-1 of the sheath 11b.

As described above, in FIGS. 1 and 2, among both ends of each of the heat generation unit 11, the electric wires 12, the ground wire 13 and the first covering member 21 to the fourth covering member 24, the leading tip side ends are denoted by reference numerals that are formed by adding "1" with a hyphen "-" to the corresponding reference numerals, and the base side ends are denoted by reference numerals that are formed by adding "2" with a hyphen "-" to the corresponding reference numerals.

The first covering member 21 includes an electrical conductor and is provided as a conductive cover that covers the electric wires 12 at least partially and is grounded. The electric wires 12 and the ground wire 13 extend to run through the inner space of the first tubular covering member 21a and are partially covered by the first tubular covering member 21a. Thus, the first covering member 21 functions as a shield to protect the electric wires 12 and the ground wire 13.

The first covering member 21 in the present example extends over a range from a position (the leading tip side end 21-1) to cover the heat generation unit 11 (in particular, the base side end 11b-2 (see FIG. 2) of the sheath 11b), to a position (the base side end 21-2) to protrude from each of the second covering member 22 through the fourth covering member 24. Specifically, the leading tip side end 21-1 of the first covering member 21 extends along the outer circumference surface of the heat generation unit 11 (in particular, the sheath 11b) and is electrically connected to the sheath 11b. On the other hand, the base side end 21-2 of the first covering member 21 is electrically connected to a ground as described below.

The first covering member 21 includes: the first tubular covering member 21a; and a non-tubular first extension covering member 21b (see FIG. 1) extending from the base side end of the first tubular covering member 21a. The leading tip side end 21-1 of the first covering member 21 is formed by the first tubular covering member 21a, and the base side end 21-2 is formed by the first extension covering member 21b. The first tubular covering member 21a and the first extension covering member 21b have a flexibility enough to be bendable and are made of metal for instance.

The first tubular covering member 21a shown in FIGS. 1 and 2 has a mesh structure having a mesh shape and extends partially along the outer circumference surface of the sheath 11b beyond the base side end 11b-2 of the sheath 11b (including the part to which the ground wire 13 is joined). This allows the first tubular covering member 21a to exhibit excellent bendability and flexibility while ensuring excellent rupture resistance, and can be bent in any direction as needed. Further, the first tubular covering member 21a is securely in contact with and electrically connected to each of the sheath 11b and the ground wire 13.

The second covering member 22 to the fourth covering member 24 have an electrical insulating property and are provided as insulating covers that cover the conductive cover (i.e., the first covering member 21) at least partially. The second covering member 22 to the fourth covering member 24 may at least partially cover the heat generation unit 11. In the present example, as shown in FIG. 2, the sheath 11b and the heat generating bodies 11a forming the base side end 11-2 of the heat generation unit 11 are covered by the third covering member 23 and the fourth covering member 24.

It is possible that each of the second covering member 22 through the fourth covering member 24 has any material and any configuration that exhibit an electrical insulating property and may include at least any one of resin and elastomer (including rubber) for instance. In a case where each of the second covering member 22 through the fourth covering member 24 is formed by an elastic material with excellent elasticity, such as an elastomer, it is advantageous in bending the second covering member 22 through the fourth covering member 24.

The second covering member 22 has a tubular shape and at least partially covers the first covering member 21 (and thus the electric wires 12 and the ground wire 13, which extend in the inner space of the first covering member 21). In the present example, the first covering member 21, the third covering member 23, and the fourth covering member 24 protrude from the second covering member 22 at the leading tip side (see FIG. 2), and the first covering member 21 protrudes from the second covering member 22 at the base side (see FIG. 1). Further, the second covering member 22 protrudes, at the base side, from each of the third covering member 23 and the fourth covering member 24.

With respect to the longitudinal direction of the heater 10, the second covering member 22 is separated from the heat generation unit 11 (the heat generating bodies 11a and the sheath 11b), and the second covering member 22 does not cover the heat generation unit 11. The electric wires 12 and the ground wire 13 protrude, at both ends of the second covering member 22, from the second covering member 22.

The third covering member 23 has a tubular shape and at least partially covers the second covering member 22 (and thus the first covering member 21, the electric wires 12 and the ground wire 13, which extend in the inner space of the second covering member 22). In the present example, the third covering member 23 protrudes, at the leading tip side, from the first covering member 21 and the second covering member 22 (see FIG. 2), and the first covering member 21, the second covering member 22 and the fourth covering member 24 protrude, at the base side, from the third covering member 23 (see FIGS. 1 and 2). Further, the third covering member 23 extends partially along the outer circumference surface of the sheath 11b beyond the base side end 11b-2 of the sheath 11b (including the part where the ground wire 13 is joined).

With respect to the extension direction of the heater 10, the leading tip position of the leading tip end 23-1 of the third covering member 23 is almost the same as the leading tip position of the leading tip end 24-1 of the fourth covering member 24. The third covering member 23 protrudes more greatly than the electric wires 12 and the ground wire 13 at the leading tip side, but at the base side, the electric wires 12 and the ground wire 13 protrude from the third covering member 23.

The fourth covering member 24 has a tubular shape and at least partially covers the third covering member 23 (and thus the second covering member 22, the first covering member 21, the electric wires 12 and the ground wire 13, which extend in the inner space of the third covering member 23). In the present example, the fourth covering member 24 protrudes from the first covering member 21 and the second covering member 22 at the leading tip side (see FIG. 2), and the first covering member 21 and the second covering member 22 protrude from the fourth covering member 24 at the base side (see FIGS. 1 and 2). Further, the fourth covering member 24 extends partially along the outer circumference surface of the sheath 11b beyond the base side end 11b-2 of the sheath 11b (including the part where the ground wire 13 is joined).

With respect to the extension direction of the heater 10, the leading tip position of the leading tip end 24-1 of the fourth covering member 24 is almost the same as the leading tip position of the leading tip end 23-1 of the third covering member 23. The fourth covering member 24 protrudes more greatly than the electric wires 12 and the ground wire 13 at the leading tip side, but at the base side, the electric wires 12 and the ground wire 13 protrude from the fourth covering member 24.

In the present embodiment, the fourth covering member 24 (i.e., a second insulating covering member) has a smaller stiffness than the third covering member 23 (i.e., a first insulating covering member). Specifically, the fourth covering member 24 is softer and easier to bend than the third covering member 23, and has better shock absorbing capability than the third covering member 23.

The first covering member 21 through the fourth covering member 24 extend over the range described above in such a manner that the first covering member 21 through the fourth covering member 24 are provided in a concentric fashion at the portion of the heater 10 indicated by the cross-sectional line "III" in FIG. 2 (see FIG. 3).

[Heat Processing Device]

Next, an example of a processing device that the above-mentioned heater comprises will be described.

Figure 4:
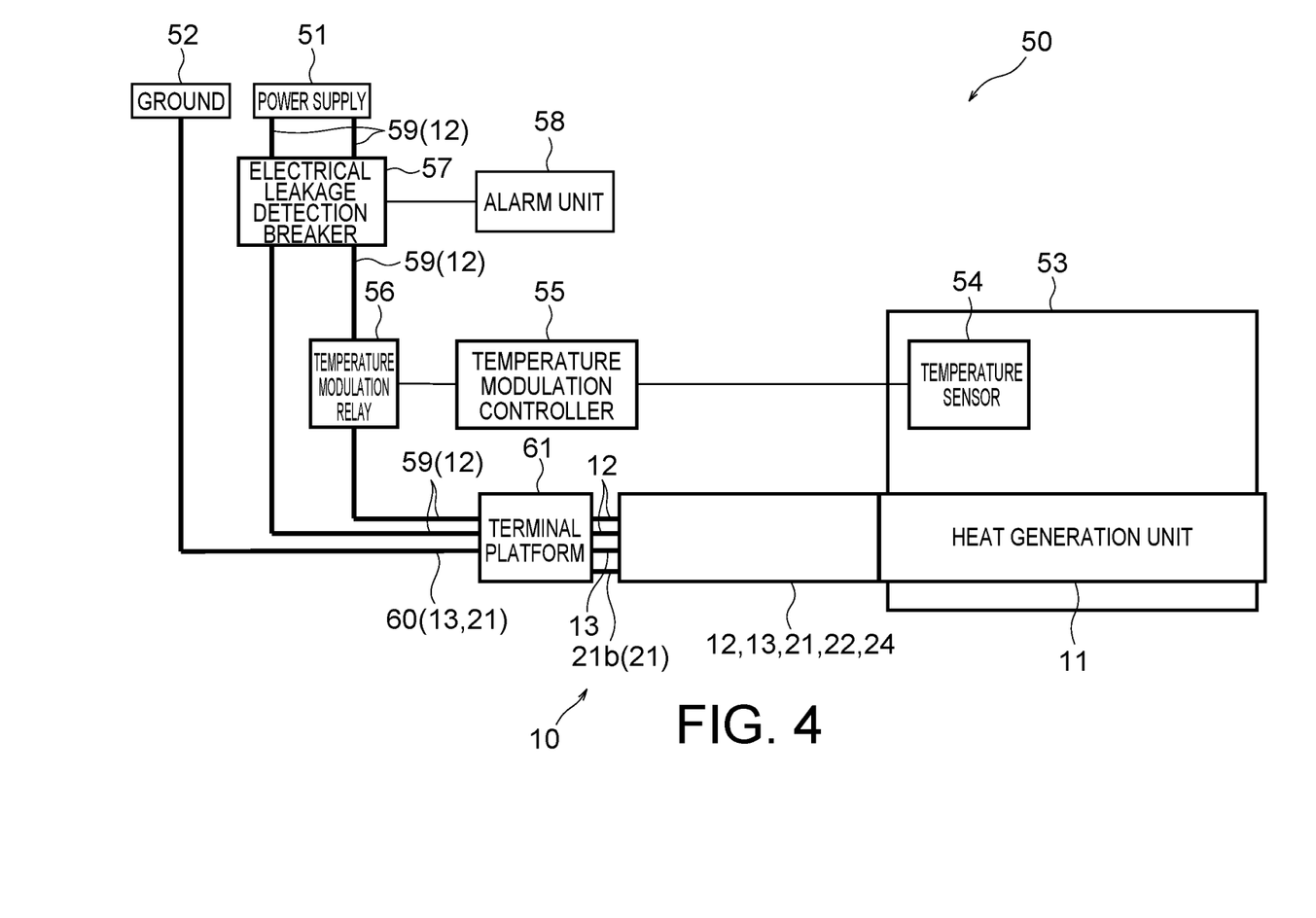
FIG. 4 is a block diagram showing one example of a heat processing device equipped with a heater.

FIG. 4 is a block diagram showing one example of a heat processing device comprising the heater 10 described above.

The heat processing device 50 shown in FIG. 4 comprises a power supply 51, a ground 52, a heater 10, a heat body 53, a temperature sensor 54, a temperature modulation controller 55, a temperature modulation relay 56, an electrical leakage detection breaker (an electrical leakage detection unit) 57, an alarm unit 58, and a connection terminal part 61.

The electric wires 12 of the heater 10 are electrically connected to the power supply 51 via the connection terminal part (a terminal platform) 61. Specifically, the electric wire body parts 12a (see FIG. 1) of the electric wires 12 are connected, at the connection terminal part 61, to power supply connection wires 59 extending from the power supply 51.

Further, the ground wire 13 and the first covering member 21 (in the present example, the first extension covering member 21b) are electrically connected to the ground 52 via the connection terminal part 61 to be grounded. Specifically, each of the ground wire body part 13a of the ground wire 13 and the first extension covering member 21b of the first covering member 21 is connected, at the connection terminal part 61, to a ground connection wire 60 extending from the ground 52.

Thus, from a functional standpoint, the power supply connection wires 59 can be regarded as the electric wires 12 for connecting the heat generation unit 11 to the power supply 51, and the ground connection wire 60 can be regarded as the ground wire 13 and the first covering member 21 that are connected to the ground 52.

The power supply connection wires 59 are provided with the temperature modulation relay 56 and the electrical leakage detection breaker 57.

The temperature modulation relay 56 switches the conduction and non-conduction of current in the power supply connection wires 59 under the control of the temperature modulation controller 55.

The electrical leakage detection breaker 57 detects the current value flowing through the power supply connection wires 59 (for instance, the difference (absolute value difference) between the current value of the current from the power supply 51 to the heat generation unit 11 and the current value of the current from the heat generation unit 11 to the power supply 51), and based on said detection results, determines whether an electrical leakage has occurred. Then, the electrical leakage detection breaker 57 switches the conduction and non-conduction of the current in the power supply connection wires 59 according to the determination results of an electrical leakage. Specifically, the electrical leakage detection breaker 57 maintains the power supply connection wires 59 in a current-conducting state during no occurrence of an electrical leakage being detected, but switches the power supply connection wires 59 to a current non-conducting state when the occurrence of an electrical leakage is detected.

The alarm unit 58 is connected to the electrical leakage detection breaker 57 and generates an alarm according to the determination results of the occurrence of an electrical leakage by the electrical leakage detection breaker 57. Specifically, the alarm unit 58 issues an alarm when the electrical leakage detection breaker 57 determines the occurrence of an electrical leakage, in order to notify the user(s) of the occurrence of an electrical leakage.

The heat generation unit 11 of the heater 10 and the temperature sensor 54 are attached to the heat body 53. The heat body 53 is heated by the heat generation unit 11 and the temperature of the heat body 53 is measured by the temperature sensor 54. The measurement results by the temperature sensor 54, which are the temperature of the heat body 53, are sent to the temperature modulation controller 55.

The temperature modulation controller 55 controls the temperature modulation relay 56 to switch the conduction and non-conduction of the current in a power supply connection wire 59 based on the measurement results by the temperature sensor 54 (in other words, the temperature of the heat body 53). As one example, the temperature modulation controller 55 may control the temperature modulation relay 56 in such a manner that the power supply connection wires 59 are placed in a current conducting state when the temperature of the heat body 53 indicated by the measurement results by the temperature sensor 54 is lower than a temperature threshold defined based on a desired temperature range. In this case, electric current is supplied to the heat generating bodies 11*a* of the heat generation unit 11 so that the heat body 53 is heated by the heat generation unit 11. On the other hand, the temperature modulation controller 55 may control the temperature modulation relay 56 in such a manner that the power supply connection wires 59 are placed in a current non-conducting state when the temperature of the heat body 53 indicated by the measurement results by the temperature sensor 54 is equal to or is greater than the temperature threshold. In this case, no current is supplied to the heat generating bodies 11*a* of the heat generation unit 11 and the heat generating bodies 11*a* does not generate heat, and as a result, the temperature of the heat body 53 naturally drop toward the temperature threshold.

By using the heat processing device 50 having the above-described configuration, the temperature of the heat body 53 can be adjusted within the desired temperature range, whereas in the event that an electrical leakage occurs, the power supply connection wires 59 can be switched to a current non-conducting state to prevent the users form receiving an electric shock.

[Container Processing Apparatus]

The heater 10 and the heat processing device 50 described above can be applied to various applications in various devices, and the devices and the applications to which the heater 10 and the heat processing device 50 can be applied are not limited. Below, a case where the heater 10 and the heat processing device are applied to a packaging system (a container processing apparatus) using bags is described as an example. However, the heater 10 and the heat processing device may also be applied to container processing apparatuses other than the packaging system described below (e.g., to a container processing apparatus that uses cans as containers (not shown in the drawings)).

Figure 5:
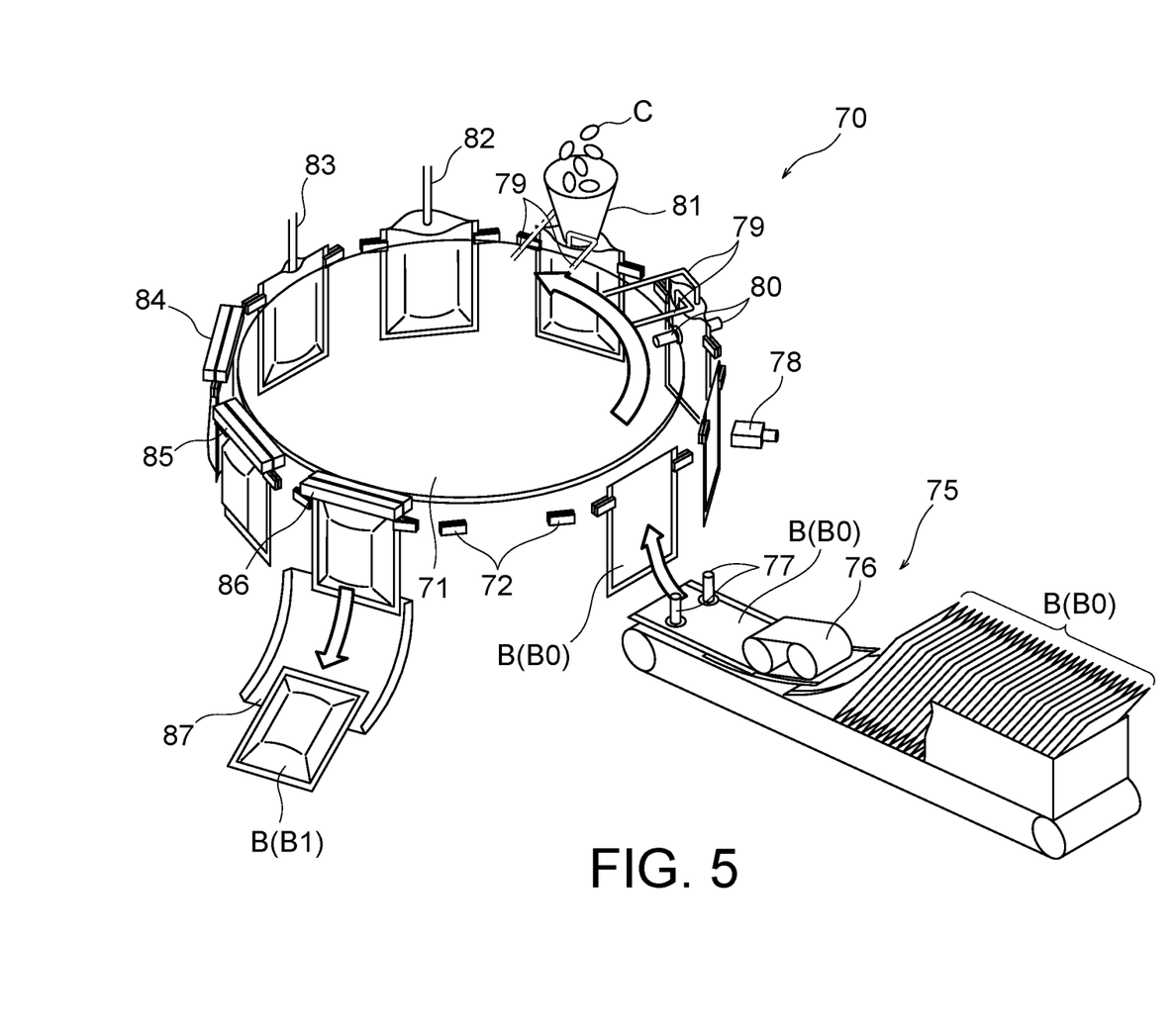
FIG. 5 is a diagram showing one example of a packaging system (i.e., a packaging facility)

FIG. 5 is a diagram showing one example of a packaging system 70 (i.e., a packaging facility). The packaging system 70 shown in FIG. 5 performs, on a bag B, a print processing, a mouth opening processing, a content introduction processing, a gas injection processing, a sealing processing, and a release processing in sequence.

Specifically, the packaging system 70 comprises a conveyance table 71 and a plurality of bag support units 72 for intermittently conveying bags B. Each bag support unit 72 has two grippers (i.e., a gripper pair) that releasably support both side portions of a bag B, respectively.

The conveyance table 71 is rotated intermittently around its central axis line by a driving device such as a motor (not shown in the drawings). The plurality of bag support units 72 are fixedly attached to the outer periphery of the conveyance table 71 at equal intervals (at equal angular interval), and repeatedly move and stop in an intermittent manner along a circular path in accordance with the intermittent rotation of the conveyance table 71.

The number of plurality of bag support units 72 corresponds to the number of processing stations provided along the travel path (i.e., the circular path) of each bag support unit 72. In the packaging system 70 shown in FIG. 5, there are a first processing station to a tenth processing station that are provided at equal intervals (at equal angular interval) along the travel path of each bag support unit 72, and ten bag support units 72 are provided. During the time when the intermittent rotation of the conveyance table 71 stops, the ten bag support units 72 are arranged at the first to tenth processing stations respectively, and each bag support unit 72 intermittently stops at the first to tenth processing stations in sequence.

In the first processing station, a conveyor magazine 75, a bag transmission device 76 and a bag take-out device 77 are provided. The conveyor magazine 75 stores a plurality of bags B (i.e., empty bags B0). The bag transmission device 76 sends out the bags B stored in the conveyor magazine 75 one by one. The bag take-out device 77 takes out a bag B sent out by the bag transmission device 76 and passes the bag B to a bag support unit 72 that is intermittently stopped at the first processing station.

A bag support unit 72 moves while supporting a bag B (i.e., an empty bag B0) which has been passed to the bag support unit 72 at the first processing station, and stops intermittently at the second processing station where a printing device 78 is provided. The printing device 78 is a printer that performs a print processing on the bag B. The bag B supported by the bag support unit 72 undergoes a print processing performed by the printing device 78 to print various information (e.g., date of manufacture, etc.) thereon while being intermittently stopped at the second processing station.

After that, the bag support unit 72 moves while supporting the bag B and intermittently stops at the third processing station where a mouth opening support unit 79 and a mouth opening device 80 are provided. The mouth portion of the bag B (in the present example, the top end part of the bag B) that is supported by bag support unit 72 is opened by the mouth opening device 80 and an opening state of the mouth portion is kept by the mouth opening support unit 79 during the intermittent stop at the third processing station.

After that, the bag support unit 72 moves while supporting the bag B and stops intermittently at the fourth processing station where a content introduction unit 81 is provided. While the bag B supported by the bag support unit 72 is intermittently stopping at the fourth processing station, solid contents C are introduced into the bag B by the content introduction unit 81. For instance, the content introduction unit 81 may have a hopper that can be moved up and down, and solid contents C may be dispensed from the bottom end of the hopper toward the inside of the bag B in a state where the bottom end of the hopper is located inside the bag B.

While the bag support unit 72 is moving from the third processing station to the fourth processing station, the mouth opening support unit 79 moves along with the bag B supported by the bag support unit 72 to keep the mouth open state of the bag B. After that, the mouth opening support unit 79 returns from the fourth processing station to the third processing station in a state where the hopper of the content introduction unit 81 and/or the solid contents C are positioned inside the bag B for instance.

After that, the bag support unit 72 moves while supporting the bag B and stops intermittently at the fifth processing station where a content injection device 82 is provided. While the bag B supported by the bag support unit 72 is intermittently stopping at the fifth processing station, liquid contents are injected, by the content injection device 82, into the bag B supported by the bag support unit 72.

After that, the bag support unit 72 moves while supporting the bag B and stops intermittently at the sixth processing station where a gas injection device 83 is provided. While the bag B supported by the bag support unit 72 is intermittently stopping at the sixth processing station, a gas is introduced, by the gas injection device 83, inside the bag B supported by the bag support unit 72. The gas that is introduced into the interior of the bag B from the gas injection device 83 is not limited; for instance, an inert gas such as nitrogen or a water vapor may be blown into the bag B by the gas injection device 83.

After that, the bag support unit 72 moves while supporting the bag B and intermittently stops at the seventh processing station where a first heat sealing device 84 is provided. The first heat sealing device 84 performs a heat sealing processing on the bag B. Specifically, while the bag B supported by the bag support unit 72 is intermittently stopping at the seventh processing station, the mouth portion of the bag B supported by the bag support unit 72 is sealed by the first heat sealing device 84.

After that, the bag support unit 72 moves while supporting the bag B and intermittently stops at the eighth processing station where a second heat sealing device 85 is provided. The second heat sealing device 85 performs a heat sealing processing on the bag B. Specifically, while the bag B supported by the bag support unit 72 is intermittently stopping at the eighth processing station, the mouth portion of the bag B supported by the bag support unit 72 is sealed by the second heat sealing device 85.

After that, the bag support unit 72 moves while supporting the bag B and intermittently stops at the ninth processing station where a cooling device 86 and a discharge shooter 87 are provided. While the bag B supported by the bag support unit 72 is intermittently stopping at the ninth processing station, the mouth portion (in particular, the sealed section) of the bag B supported by the bag support unit 72 is cooled by the cooling device 86.

The bag B (i.e., a product bag B1) that has undergone a cooling processing by the cooling device 86 is released from the bag support unit 72 and the cooling device 86 at the ninth processing station, falls down, and is guided by the discharge shooter 87 to be sent to a subsequent stage.

After that, the bag support unit 72 moves and stops intermittently at the tenth processing station. The tenth processing station in the present example is an empty station, but any processing may take place at the tenth station.

After that, the bag support unit 72 moves and stops intermittently at the first processing station again, and then a new bag B (i.e., an empty bag B0) is supplied the bag support unit 72 from the conveyor magazine 75 via the bag transmission device 76 and the bag take-out device 77 as described above.

The packaging system 70 repeats the series of processes described above, so that it can be efficiently performed to introduce the contents into a large number of bags B and to seal the mouth portions of the bags B.

[Thermal Transfer Printer]

Figure 6:
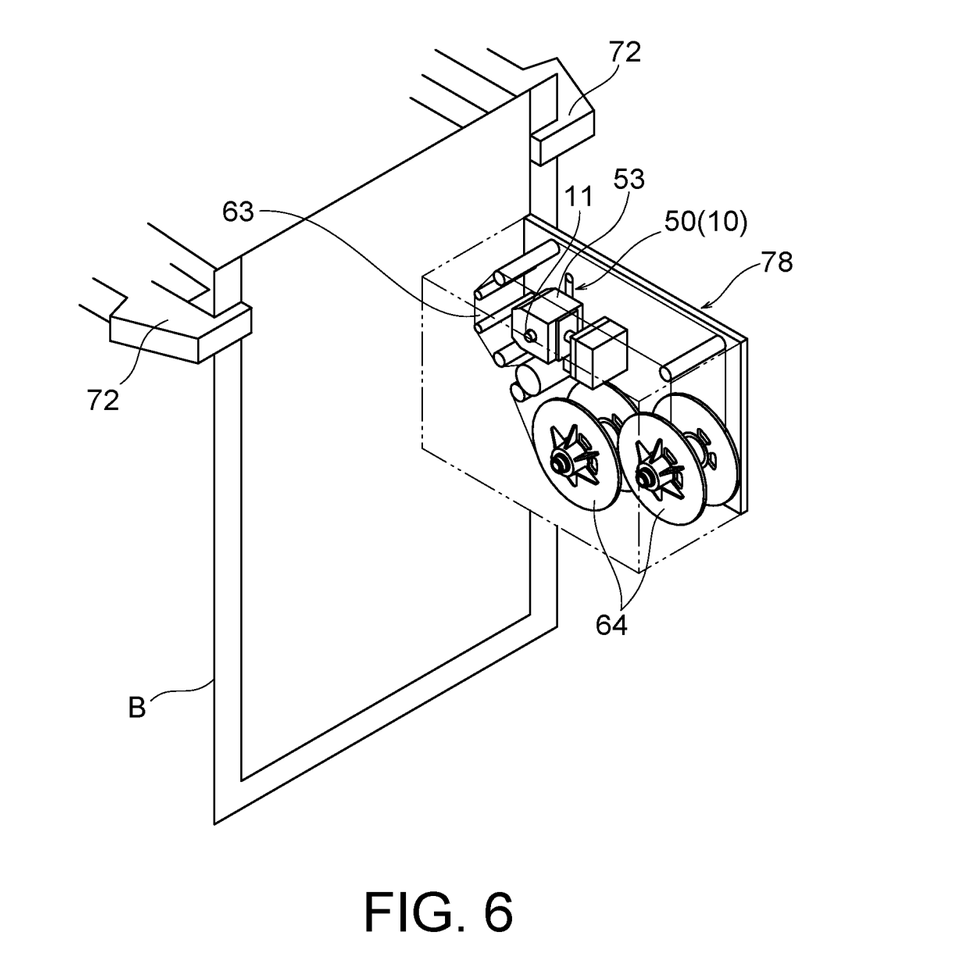
FIG. 6 is a diagram showing one example of a printing device.

FIG. 6 is a diagram showing one example of the printing device 78. FIG. 6 shows an example of the inner configuration of the printing device 78 in a see-through manner.

The printing device 78 shown in FIG. 6 is a thermal transfer printer that thermally transfers ink onto a bag B being a processing object while heating the ink-coated ink ribbon 63, and the thermal transfer printer is also referred to as a hot printer. The printing device 78 includes: a heat processing device 50 comprising the heater 10; and an ink ribbon supply unit 64 that sends out an unused portion of the film-shape ink ribbon 63 while retrieving a used portion.

The heat processing device 50 has a structure similar to that shown in FIG. 4 described above and includes the heat body 53 that is heated by the heat generation unit 11 of the heater 10 to be adjusted to a temperature within a desired temperature range. Then, the ink ribbon 63 heated by the heat body 53 is pressed against a bag B to perform the print processing on the bag B.

Specifically, the heat body 53 has a type member. The heat body 53 is moved back and forth by a movement driving device (for instance, an air cylinder) in such a manner that the heat body 53 is placed in a position where the type member is separated from the ink ribbon 63 and in a position where the type member presses the ink ribbon 63 against the surface to be printed (i.e., a side surface portion) of a bag B. The type member makes contact with the ink ribbon 63, so that the heat emitted from the heat generation unit 11 (in particular, the heat generating bodies 11*a*) is transferred to the ink ribbon 63 via the type member. An ink portion of the ink ribbon 63 that is heated in this manner is placed in a thermal transferable state, and when the type member presses the ink ribbon 63 against a bag B, characters, etc., corresponding to the shape of the type member are printed on the bag B.

The structure of the heat body 53 is not limited. The heat body 53 may, for instance, comprise the type member and a type support member that removably supports the type member. The type support member may be formed by a single block or may include a plurality of blocks that are removable from each other. For instance, the heat body 53 may include: a type holder that supports the heat generation unit 11 and is directly heated by the heat generation unit 11; a type case that is removably supported by the type holder and to which heat is transferred from the type holder; and the type member that is removably supported by the type case and to which heat is transferred from the type case.

In the example shown in FIG. 6, the ink ribbon 63 is supported and guided by a plurality of guide pins and/or guide rollers, and the portion of the ink ribbon 63 that faces the surface to be printed (i.e., the side surface portion) of a bag B and extends generally parallel to the surface to be printed is pressed against the bag B by the type member of the heat body 53 in such a manner that the print processing is performed.

[Heat Sealing Device]

Figure 7:
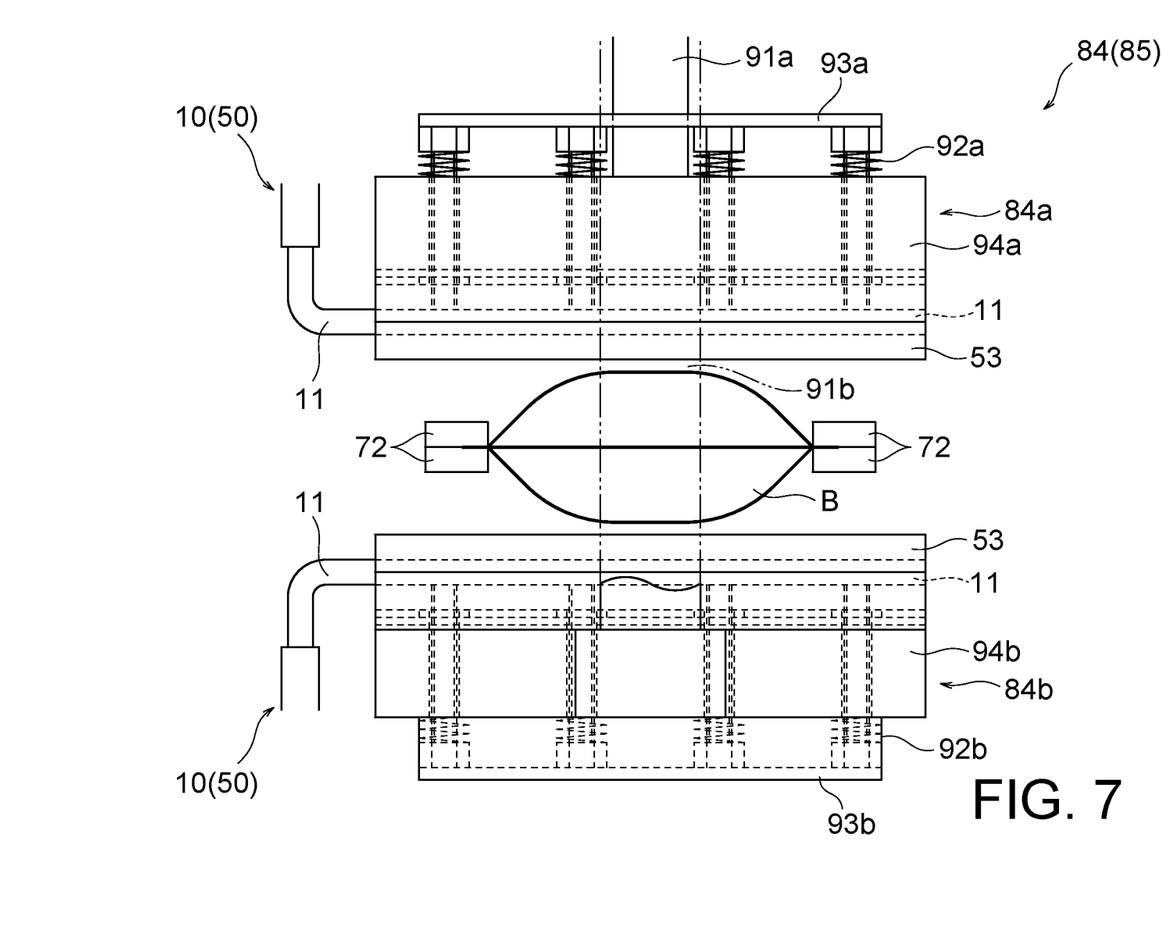
FIG. 7 is a plan view showing one example of a first heat sealing device.

FIG. 7 is a plan view showing one example of the first heat sealing device 84. The first heat sealing device 84 and the second heat sealing device 85 have the same structure.

The first heat sealing device 84 shown in FIG. 7 comprises a first heating unit 84*a* and a second heating unit 84*b*, and each of the first heating unit 84*a* and the second heating unit 84b includes the heat processing device 50 (including the heat generation unit 11 and the heat body 53).

The first heating unit 84a includes: a movement support unit 91a that supports a fixing support unit 93a in a fixed manner while supporting a movable support unit 94a in a movable manner; and elastic members 92a disposed between the fixing support unit 93a and the movable support unit 94a. The elastic members 92a exert an elastic force on the fixing support unit 93a and the movable support unit 94a in a direction in which the fixing support unit 93a and the movable support unit 94a are away from each other. The heat body 53 has a block shape and is attached to the movable support unit 94a.

The second heating unit 84b is configured similarly to the first heating unit 84a. Specifically, the second heating unit 84b comprises a movement support unit 91b, elastic members 92b, a fixing support unit 93b and a movable support unit 94b, and a block-shaped heat body 53 is attached to the movable support unit 94b. In FIG. 7, the movement support unit 91b is shown by a chain double-dashed line in a see-through manner, and thus elements located below the movement support unit 91b are shown.

The heat body 53 of the first heating unit 84a and the heat body 53 of the second heating unit 84b are arranged facing each other. The first heating unit 84a and the second heating unit 84b are moved back and forth by the power transmitted from a movement driving unit (not shown in the drawings), such as an air cylinder, via the movement support units 91a, 91b in such a manner that the heat bodies 53 are moved closer to each other or away from each other.

While a bag support unit 72 is moving from the sixth processing station to the seventh processing station, the heat body 53 of the first heating unit 84a and the heat body 53 of the second heating unit 84b are positioned away from each other, and the mouth portion of a bag B supported by the bag support unit 72 is positioned between the heat bodies 53 at the seventh processing station.

After that, while the bag support unit 72 and the bag B are intermittently stopping at the seventh processing station, the first heating unit 84a and the second heating unit 84b move in such a manner that their respective heat bodies 53 approach each other to pressurize and heat the mouth portion of the bag B. As a result, the mouth portion of the bag B is heat-sealed. At this time, the heat bodies 53 of the first heating unit 84a and the second heating unit 84b exert a force against each other through the mouth portion of the bag B and approach the fixing support units 93a, 93b along with the movable support units 94a, 94b. On the other hand, the movable support units 94a, 94b and the fixing support units 93a, 93b receive elastic forces, from the elastic members 92a, 92b, acting in a direction in which they are away from each other. This makes it possible for the mouth portion of the bag B to be pressurized by the heat bodies 53 with a force having an appropriate degree, so that the mouth portion of the bag B can be heat-sealed in a stable manner.

After that, while the bag support unit 72 is intermittently stopping at the seventh processing station, the first heating unit 84a and the second heating unit 84b move in such a manner that the respective heat bodies 53 move away from each other to be away from the bag B.

After that, the bag support unit 72 moves intermittently from the seventh processing station to the eighth processing station along with the bag B having the sealed mouth portion, and a next bag support unit 72 moves intermittently from the sixth processing station to the seventh processing station along with a bag B that is in unsealed condition.

As described above, the heater 10 of the present embodiment comprises: the heat generation unit 11 that generates heat when energized; the electric wires 12 that are attached to the heat generation unit 11 and supply electric current to the heat generation unit 11; the ground wire 13 that is attached to the heat generation unit 11 and is grounded; the first covering member 21 that includes an electric conductor, is attached to the heat generation unit 11 and is grounded; and the insulating cover (i.e., the second covering member 22 to the fourth covering member 24) that has an electrical insulating property and at least partially covers the first covering member 21.

In this heater 10, the heat generation unit 11 is grounded through the ground wire 13 and the first covering member 21, and thus it can effectively prevent users who may come in contact with the heat generation unit 11, from receiving an electric shock. In particular, the heat generation unit 11 is provided with two ground paths by the ground wire 13 and the first covering member 21 respectively; therefore, even if one of the ground paths does not function for some reason, the other ground path can prevent the users from receiving an electric shock.

Further, the first covering member 21 includes a part extending along the outer circumference surface of the heat generation unit 11, and the insulating cover (in the present embodiment, the third covering member 23 and the fourth covering member 24) includes a part extending along the outer circumference surface of the heat generation unit 11.

This makes is possible for the first covering member 21 to be electrically connected to the heat generation unit 11 in a more reliable manner. Further, the heat generation unit 11 can be protected by the insulating cover (i.e., the third covering member 23 and the fourth covering member 24).

Further, the first covering member 21 may contain a metal and may have flexibility, and the insulating cover (i.e., the second covering member 22 through the fourth covering member 24) may contain at least one of a resin and an elastomer.

This configuration is advantageous to bending the first covering member 21 in a posteriori manner. Further, this configuration is advantageous to reducing the weight of the insulating cover (i.e., the second covering member 22 to the fourth covering member 24). In particular, in cases where the insulating cover (i.e., the second covering member 22 through the fourth covering member 24) contains an elastomer, it is advantageous to bending the insulating cover (i.e., the second covering member 22 through the fourth covering member 24) in a posteriori manner.

Further, the first covering member 21 has at least partially a mesh shape.

This makes it possible for the first covering member 21 to have both high strength and high flexibility, so that the first covering member 21 can be bent in various directions.

Further, the heater 10 comprises the electrical leakage detection breaker 57 that detects an electrical leakage.

This makes it possible for a user to recognize occurrence of an electrical leakage in the heater 10 and thus to implement a measure for eliminating the electrical leakage. In the present example, the electrical leakage detection breaker 57 that is capable of performing electrical leakage detection and circuit interruption is provided; however, an electrical leakage detection unit that performs electrical leakage detection but does not perform circuit interruption may be provided. When such an electrical leakage detection unit detects an electrical leakage in the heater a user may take appropriate measurement according to the detection result in order to address the electrical leakage.

Further, each of the first heat sealing device 84 and the second heat sealing device 85 has the heater 10 described above, the heat generation unit 11 includes: the heat generating bodies 11a that generate heat when energized; and the sheath 11b that covers the heat generating bodies 11a, and the insulating cover (i.e., the second covering member 22 to the fourth covering member 24) includes: the third covering member 23 that at least partially covers the first covering member 21; and the fourth covering member 24 that at least partially covers the third covering member 23 and has a smaller stiffness than the third covering member 23.

This makes it possible for users who may come in contact with the heat generation unit 11, to be effectively prevented from receiving an electric shock. Further, the third covering member 23 and the fourth covering member 24 having the stiffness relationship described above are advantageous to adjusting the balance of stiffness and flexibility of the heater 10. In particular, the heaters 10 that are included in the first heat sealing device 84 and the second heat sealing device 85 and are provided to be movable, can deform parts other than the heat generation unit 11 in accordance with the movement of the first heat sealing device 84 and the second heat sealing device 85. Thus, when the parts of the heater 10 other than the heat generation unit 11 have a good balance of stiffness and flexibility, the first heat sealing device 84 and the second heat sealing device 85 can perform the sealing processing with high accuracy.

Further, the printing device 78, which thermally transfers an ink to an object while heating the ink-coated ink ribbon 63, includes the heater 10, the heat generation unit 11 includes: the heat generating bodies 11a that generate heat when energized; and the sheath 11b that covers the heat generating bodies 11a, and the insulating cover (i.e., the second covering member 22 to the fourth covering member 24) includes: the third covering member 23 that at least partially covers the first covering member 21; and the fourth covering member 24 that at least partially covers the third covering member 23 and has less stiffness than the third covering member 23, and the heat generation unit 11 heats the ink ribbon 63.

This makes it possible for users who may come in contact with the heat generation unit 11, to be effectively prevented from receiving an electric shock. Further, it is possible that the parts of the heater 10 other than the heat generation unit 11 have a good balance of stiffness and flexibility and the printing device 78 can perform the print processing with high precision.

Further, the packaging system 70 comprises the first heat sealing device 84 and the second heat sealing device 85 that perform heat sealing processing on a bag B. Further, the packaging system 70 comprises the printing device 78 that performs a print processing on a bag B.

This makes it possible to provide the packaging system 70 that can effectively prevent users from receiving an electrical shock.

The present disclosure is not limited to the embodiments and variations described above. For instance, various modifications may be added to each element of the above-described embodiments and variations, and configurations may be partially or entirely combined among the above-described embodiments and variations. Further, the effects produced by the present disclosure are not limited to the effects described above, and effects specific to the specific configuration of each embodiment may also be produced. As described above, various additions, modifications and partial deletions may be made to each element described in the claims, specification and drawings to the extent that they do not depart from the technical concept and the spirit of the present disclosure.

Additional Notes

The present disclosure may also adopt the following configurations.

[Item 1]
A heater comprising:
a heat generation unit that generates heat when energized;
an electric wire that is attached to the heat generation unit and supplies electric current to the heat generation unit;
a ground wire that is attached to the heat generation unit and is grounded;
a conductive cover that includes an electrical conductor, is attached to the heat generation unit, and is grounded; and
an insulating cover that has an electrical insulating property and at least partially covers the conductive cover.

[Item 2]
The heater as defined in item 1,
wherein the conductive cover includes a part extending along an outer circumference surface of the heat generation unit, and
wherein the insulating cover includes a part extending along the outer circumference surface of the heat generation unit.

[Item 3]
The heater as defined in item 1 or 2,
wherein the conductive cover contains a metal and is flexible, and
wherein the insulating cover contains at least one of a resin and an elastomer.

[Item 4]
The heater as defined in any one of items 1 to 3, wherein the conductive cover has at least partially a mesh shape.

[Item 5]
The heater as defined in any one of items 1 to 4, comprising an electrical leakage detection unit that detects an electrical leakage.

[Item 6]
A heat sealing device comprising a heater defined in any one of items 1 to 5,
wherein the heat generation unit includes: a heat generating body that generates heat when energized; and a sheath that covers the heat generating body, and
wherein the insulating cover includes:
a first insulating covering member that at least partially covers the conductive cover; and
a second insulating covering member that at least partially covers the first insulating covering member and has a smaller stiffness than the first insulating covering member.

[Item 7]
A thermal transfer printer that heats an ink ribbon to which an ink is applied and thermally transfers the ink to an object, the thermal transfer printer comprising a heater defined in any one of items 1 to 5,
wherein the heat generation unit includes: a heat generating body that generates heat when energized; and a sheath that covers the heat generating body,
wherein the insulating cover includes:
a first insulating covering member that at least partially covers the conductive cover; and a second insulating covering member that at least partially covers the first insulating covering member and has a smaller stiffness than the first insulating covering member, and wherein the ink ribbon is heated by the heat emitted from the heat generating body.

[Item 8]

A container processing apparatus comprising a heat sealing device defined in item 6 that performs a heat sealing processing on a container.

[Item 9]

A container processing apparatus comprising a thermal transfer printer defined in item 7 that performs a print processing on a container.

The invention claimed is:

1. A heater comprising:
a heat generation unit including: a heat generating body that generates heat when energized; and a sheath that covers the heat generating body and has a part exposed to an outside;
an electric wire that is connected to the heat generating body and supplies electric current to the heat generating body;
a ground wire that is attached to the heat generation unit and is grounded;
a conductive cover that includes an electrical conductor, is attached to the heat generation unit, is grounded, and is located outside of the sheath, the electric wire and the ground wire extending inside the conductive cover; and
an insulating cover that has an electrical insulating property and at least partially covers the conductive cover.

2. The heater as defined in claim 1, wherein the conductive cover includes a part extending along an outer circumference surface of the heat generation unit, and
wherein the insulating cover includes a part extending along the outer circumference surface of the heat generation unit.

3. The heater as defined in claim 1, wherein the conductive cover contains a metal and is flexible, and
wherein the insulating cover contains at least one of a resin and an elastomer.

4. The heater as defined in claim 1, wherein the conductive cover has at least partially a mesh shape.

5. The heater as defined in claim 1, comprising an electrical leakage detection unit that detects an electrical leakage.

6. A heat sealing device comprising a heater, the heater comprising: a heat generation unit that generates heat when energized; an electric wire that is attached to the heat generation unit and supplies electric current to the heat generation unit; a ground wire that is attached to the heat generation unit and is grounded; a conductive cover that includes an electrical conductor, is attached to the heat generation unit, and is grounded; and an insulating cover that has an electrical insulating property and at least partially covers the conductive cover, wherein the heat generation unit includes: a heat generating body that generates heat when energized; and a sheath that covers the heat generating body, and wherein the insulating cover includes:
a first insulating covering member that at least partially covers the conductive cover; and
a second insulating covering member that at least partially covers the first insulating covering member and has a smaller stiffness than the first insulating covering member.

7. A thermal transfer printer that heats an ink ribbon to which an ink is applied and thermally transfers the ink to an object, the thermal transfer printer comprising a heater, the heater comprising: a heat generation unit that generates heat when energized; an electric wire that is attached to the heat generation unit and supplies electric current to the heat generation unit; a ground wire that is attached to the heat generation unit and is grounded; a conductive cover that includes an electrical conductor, is attached to the heat generation unit, and is grounded; and an insulating cover that has an electrical insulating property and at least partially covers the conductive cover, wherein the heat generation unit includes: a heat generating body that generates heat when energized; and a sheath that covers the heat generating body, wherein the insulating cover includes:
a first insulating covering member that at least partially covers the conductive cover; and
a second insulating covering member that at least partially covers the first insulating covering member and has a smaller stiffness than the first insulating covering member, and
wherein the ink ribbon is heated by the heat emitted from the heat generating body.

8. A container processing apparatus comprising a heat sealing device defined in claim 6 that performs a heat sealing processing on a container.

9. A container processing apparatus comprising a thermal transfer printer defined in claim 7 that performs a print processing on a container.

* * * * *